(12) United States Patent
Heseding et al.

(10) Patent No.: US 12,377,851 B2
(45) Date of Patent: Aug. 5, 2025

(54) METHOD FOR SUPPORTING A TRACTION VEHICLE IN THE EVENT OF TRACTION LOSS

(71) Applicant: ZF CV Systems Global GmbH, Bern (CH)

(72) Inventors: Johannes Heseding, Hannover (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 240 days.

(21) Appl. No.: 17/577,682

(22) Filed: Jan. 18, 2022

(65) Prior Publication Data

US 2022/0135041 A1    May 5, 2022

Related U.S. Application Data

(63) Continuation of application No. PCT/EP2020/069208, filed on Jul. 8, 2020.

(30) Foreign Application Priority Data

Jul. 22, 2019  (DE) ..................... 10 2019 119 786.4

(51) Int. Cl.
  *B60W 30/18* (2012.01)
  *B60R 16/023* (2006.01)
  *B62D 59/04* (2006.01)

(52) U.S. Cl.
  CPC ... *B60W 30/18172* (2013.01); *B60R 16/0231* (2013.01); *B62D 59/04* (2013.01);
  (Continued)

(58) Field of Classification Search
  CPC ....... B60W 30/18172; B60W 2300/14; B60W 2510/18; B60W 2520/22;
  (Continued)

(56) References Cited

U.S. PATENT DOCUMENTS

2005/0001477 A1 * 1/2005 Mederer ............... B60T 15/027
                                                      303/113.5
2009/0107748 A1   4/2009 Luehrsen et al.
(Continued)

FOREIGN PATENT DOCUMENTS

CN    101423029 A    5/2009
CN    108349471 A    7/2018
(Continued)

OTHER PUBLICATIONS

Liang Chu et al. Estimation of Articulation Angle for Tractor Semi-trailer Based on State Observer, 2010 International Conference on Measuring Technology and Mechatronics Automation, 2010 IEEE. (Year: 2010).*

(Continued)

*Primary Examiner* — Joan T Goodbody
(74) *Attorney, Agent, or Firm* — Walter Ottesen, P.A.

(57) ABSTRACT

The disclosure relates to a method for assisting a towing vehicle in the event of a loss of traction via a trailer vehicle. The method includes determining a differential slip between a driven wheel and a driveless wheel of the towing vehicle via a brake control unit and generating an acceleration demand dependent on the determined differential slip. The method further includes transmitting the acceleration demand to a trailer brake control unit, generating an activation signal for an electric drive of the trailer vehicle in dependence upon the acceleration demand in the trailer brake control unit, transmitting an activation signal to the electric drive of the trailer vehicle and generating a drive torque via the electric drive in dependence upon the activation signal. The disclosure furthermore relates to a towing vehicle, a trailer vehicle, and a combination thereof for carrying out the method.

20 Claims, 2 Drawing Sheets

(52) U.S. Cl.
CPC ..... *B60W 2300/14* (2013.01); *B60W 2510/18* (2013.01); *B60W 2520/22* (2013.01); *B60W 2520/263* (2013.01); *B60W 2520/266* (2013.01); *B60W 2530/10* (2013.01); *B60W 2530/203* (2020.02); *B60W 2540/10* (2013.01); *B60W 2710/083* (2013.01)

(58) Field of Classification Search
CPC ..... B60W 2520/263; B60W 2520/266; B60W 2530/10; B60W 2530/203; B60W 2540/10; B60W 2710/083; B60W 2720/106; B60R 16/0231; B62D 59/04
See application file for complete search history.

(56) References Cited

U.S. PATENT DOCUMENTS

| | | | |
|---|---|---|---|
| 2009/0255746 | A1 | 10/2009 | Boesch |
| 2010/0292898 | A1* | 11/2010 | Stoehr ................ B60C 23/009 701/48 |
| 2018/0080852 | A1* | 3/2018 | Hagan, Jr. ............ B60D 1/155 |
| 2018/0354478 | A1 | 12/2018 | Eckert |
| 2019/0315324 | A1 | 10/2019 | Eckert |
| 2020/0047737 | A1 | 2/2020 | Balogh |

FOREIGN PATENT DOCUMENTS

| | | | | |
|---|---|---|---|---|
| CN | 109890670 | A | 6/2019 | |
| DE | 41 33 912 | A1 | 4/1993 | |
| DE | 10 2009 008 342 | A1 | 9/2010 | |
| DE | 10 2015 009 149 | A1 | 1/2017 | |
| DE | 10 2016 210 343 | A1 | 12/2017 | |
| DE | 10 2016 213 786 | A1 | 2/2018 | |
| DE | 10 2017 210 485 | A1 | 12/2018 | |
| DE | 102017210485 | * | 12/2018 | ............ B60W 20/10 |
| EP | 2045155 | * | 4/2009 | ............ B60T 8/174 |
| WO | 93/07023 | A1 | 4/1993 | |

OTHER PUBLICATIONS

International Search Report of the European Patent Office dated Aug. 19, 2020 for international application PCT/ EP2020/069208 on which this application is based.

Written Opinion of the International Searching Authority dated Aug. 19, 2020 for international application PCT/EP2020/069208 on which this application is based.

English translation and Office action of the Chinese Patent Office dated May 12, 2024 in corresponding Chinese patent application No. 202080044204.9.

* cited by examiner

METHOD FOR SUPPORTING A TRACTION VEHICLE IN THE EVENT OF TRACTION LOSS

CROSS REFERENCE TO RELATED APPLICATIONS

This application is a continuation application of international patent application PCT/EP2020/069208, filed Jul. 8, 2020 designating the United States and claiming priority from German application 10 2019 119 786.4, filed Jul. 22, 2019, and the entire content of both applications is incorporated herein by reference.

TECHNICAL FIELD

The disclosure relates to the field of vehicle combinations with at least one towing vehicle and one trailer vehicle that is towed by the towing vehicle. In particular, the towing vehicle is a utility vehicle, such as a truck, in particular a semitrailer tractor. The trailer vehicle is preferably also a utility vehicle, preferably a semitrailer or a drawbar trailer, for example a center-axle trailer or an articulated drawbar trailer. In particular, the disclosure relates to the assistance of the towing vehicle in the event of a loss of traction, which occurs for example on a slippery road surface in the event of an acceleration being demanded by a driver, who is also referred to as vehicle driver or operator.

BACKGROUND

Driver assistance systems that assist the driver in controlling the vehicle are conventionally integrated in towing vehicles. These driver assistance systems often run in the background and intervene in the control by the driver only when necessary. This includes, for example, a traction control system in which signals from the wheel rotational speed sensors of the towing vehicle are recorded and a loss of traction can be inferred if a differential slip arises between the drive and non-drive axles. A loss of traction is assumed, for example, if the differential slip of the towing vehicle rises above a predefined threshold value. In this case, the drive torque of the drive axle is reduced in order to restore traction. If an acceleration is simultaneously demanded by the driver, the acceleration demand is then not reacted to at the degree desired by the driver owing to the reduction in torque. An acceleration lower than that desired by the driver is therefore provided.

Depending on the present driving situation, the traction control system thus duly prevents the towing vehicle from breaking away, but at the same time the driver's comfort is impaired by the intervention and thus the non-implementation of the driver demand. In particular, dangerous situations may even arise from the fact that, in the event of a loss of traction of a vehicle that has come to a standstill in a danger area, for example on an intersection, the vehicle cannot leave the intersection in good time and thus poses a hazard for the other traffic.

In order to alleviate dangerous situations and increase comfort, it is known from the prior art to equip a trailer vehicle, which is coupled to the towing vehicle, with driven axles and, in the event of a loss of traction of the towing vehicle, to assist the towing vehicle by driving the wheels of the trailer vehicle. This assistance works because a loss of traction of the towing vehicle often arises if a heavily laden trailer vehicle is coupled on and has to be set in motion, wherein a comparatively better transmission of power of the wheels of the trailer vehicle to the road is possible specifically owing to the heavy load of the trailer vehicle. Given the same roadway condition, a loss of traction is therefore more likely in the case of the towing vehicle than in the case of the trailer vehicle in the described situation.

For such assistance of the towing vehicle by a trailer vehicle in the event of a loss of traction, various system solutions are known, which however often interact inefficiently with the other vehicle components. In safety-critical applications, the known system solutions can sometimes, owing to a lack of communication with the other safety systems, intervene only to a very limited extent, or not at all, to provide assistance. If, on the other hand, a high level of integration of such system solutions is sought, this has hitherto been possible only with very high outlay on additional components. In particular, from the prior art, additional interfaces between the towing vehicle and the trailer vehicle or additional sensors are necessary in order to achieve assistance in the first place.

SUMMARY

It is an object of the present disclosure to provide a method and a device for assisting a towing vehicle in the event of a loss of traction, which can be integrated to the greatest possible extent into an existing vehicle structure and vehicle functionality and which, as a result of the integration thereof, requires the least possible additional outlay on hardware.

The aforementioned object can, for example, be achieved via a method for assisting a towing vehicle in the event of a loss of traction via a trailer vehicle. The method includes: determining a differential slip between at least one driven wheel and at least one driveless wheel of the towing vehicle via a brake control unit of the towing vehicle, wherein the differential slip lies above a predefined threshold value; generating an acceleration demand in a manner dependent upon the determined differential slip in the brake control unit of the towing vehicle; transmitting the acceleration demand to a trailer brake control unit of the trailer vehicle; generating an activation signal for an electric drive of the trailer vehicle in a manner dependent upon the acceleration demand in the trailer brake control unit; transmitting the activation signal from the trailer brake control unit to the electric drive of the trailer vehicle; and, generating at least one drive torque via the electric drive in a manner dependent on the activation signal.

Accordingly, the disclosure relates to a method for assisting a towing vehicle in the event of a loss of traction via a trailer vehicle. According to the disclosure, a differential slip between at least one driven wheel and at least one driveless wheel of the towing vehicle via a brake control unit of the towing vehicle is firstly determined, which differential slip lies above a predefined threshold value. If this differential slip lies above the threshold value, this will hereinafter also be referred to as a loss of traction.

The differential slip here can preferably refer to a slip difference between the driven wheel and the driveless, that is, non-driven, wheel. This slip difference may be an absolute or relative value which represents the present slip difference or which corresponds to a rate of change of the slip difference, namely a change with respect to time, in particular in the form of a gradient. To determine the differential slip, the brake control unit of the towing vehicle can preferably record signals from wheel rotational speed sensors of the at least one driven wheel and of the at least one driveless wheel and compares these, or signals derived therefrom, with one another. A rate of change is determined for example by deriving the difference between the wheel rotational speeds with respect to time. According to an alternative or additional embodiment, the differential slip is determined via the brake control unit of the towing vehicle also by comparison of the wheel rotational speed or wheel circumferential speed of a wheel, in particular of a drive wheel, and the present speed of the towing vehicle. The present speed is then for example referred to as reference speed.

The predefined threshold value is in this case preferably selected such that the differential slip, if it lies above the threshold value, clearly does not indicate slip owing solely to the transmission of power in the case of acceleration, but is an indication of a lack of traction, for example owing to a slippery road surface. Accordingly, if the differential slip corresponds to a present slip value, then the threshold value defines a maximum permitted value beyond which a present slip value is an indication of a lack of traction. If, on the other hand, the differential slip corresponds to a rate of change of the slip difference, then the threshold value defines a maximum permitted rate of change, the exceedance of which is regarded as an indication of a lack of traction.

In the next step, an acceleration demand is generated or determined in a manner dependent on the determined differential slip in the brake control unit of the towing vehicle. The acceleration demand thus preferably describes a signal or a signal with a value, in particular a torque value, which is to be demanded to compensate for the reduced acceleration or reduced drive torque owing to the loss of traction. Preferably, at the same time as the loss of traction is detected, the torque which is desired by the driver for acceleration and which it is sought to implement via the drive upon the loss of traction is reduced owing to the differential slip that lies above the predefined threshold value. The acceleration demand generated by the brake control unit is then preferably generated so as to substantially correspond to the magnitude of the reduced torque.

It is advantageously also possible not only for the brake control unit of the towing vehicle to reduce the torque of the driven wheel, but also for individual wheels to be braked to maintain the stability of the vehicle.

According to the disclosure, in a further step, the acceleration demand is transmitted to a trailer brake control unit of a trailer vehicle. An activation signal is thereupon generated in the trailer brake control unit, which is provided for an electric drive of the trailer vehicle. The activation signal is then transmitted to the electric drive of the trailer vehicle and a drive torque is generated via the electric drive in a manner dependent on the activation signal. The drive torque generated via the electric drive preferably refers here to a positive torque that is generated via electric motors of the electric drive and which leads to the acceleration of the trailer vehicle by driving wheels that are connected to the motors.

The acceleration demand thus preferably corresponds to a desired torque or a torque demand. The term "acceleration demand" is therefore not limited exclusively to an increase of the speed here, but also includes, for example, the situation that the present speed is to be maintained and for this purpose a torque value, namely a torque demand, is determined which has a value greater than zero and which thus results in a constant speed, that is, an acceleration demand that corresponds to neither a positive nor a negative desired acceleration.

The method is characterized in particular by the fact that the existing control units, namely the brake control unit and the trailer brake control unit, are components that are already generally present in the towing vehicle or trailer vehicle, and the functionality of these only needs to be extended slightly in order to carry out the stated method. This is possible with comparatively little outlay, for example via adapted software. For example, no additional sensors are necessary to determine a loss of traction, because these are already contained in or connected to a conventional brake control unit of a towing vehicle in any case. Activation of the electric drive in the trailer vehicle directly by the towing vehicle is also not necessary, and simple communication between the towing vehicle and the trailer vehicle is therefore possible in order to implement the method.

According to an embodiment, the transmission of the acceleration demand from the brake control unit of the towing vehicle to the trailer brake control unit of the trailer vehicle includes the transmission of the acceleration demand via a CAN-ISO 11992-2 bus. This bus is present between the brake control unit of a towing vehicle and a trailer brake control unit of a trailer vehicle as standard, and according to the embodiment is jointly utilized through the use of a hitherto unused message. An additional communication interface is then not necessary to implement the function of the method according to the disclosure.

According to a further embodiment, the acceleration demand is determined in a manner dependent on the differential slip of the towing vehicle and a desired acceleration from a driver control element or a driver assistance system. Such driver control elements or driver assistance systems include, in particular, an accelerator pedal position, CAN bus information items relating to a desired engine torque, transmission information items, a cruise control system or other assistance systems. Here, allowance is made for the fact that, for example if a driver desires a different acceleration during or after a loss of traction than before the loss of traction, it is attempted, through the assistance by the electric drive in the trailer vehicle via a corresponding acceleration demand, to compensate not only the desire of the driver before the loss of traction but also a changed desire of the driver.

It is for example conceivable that, at the moment of loss of traction, a relatively low acceleration is still desired by the driver and, for example, the completion of a driving maneuver is delayed by the torque reduction controlled by the traction control system in the towing vehicle, which instinctively prompts the driver to desire a relatively higher acceleration in order to complete the driving maneuver in good time. This is allowed for by virtue of the changed desired acceleration of the driver being taken into consideration when the acceleration demand is generated.

According to a further embodiment, a vehicle state of the trailer vehicle is determined via the trailer brake control unit. The generation of the activation signal for the electric drive of the trailer vehicle is then generated in a manner dependent on the acceleration demand and additionally in a manner dependent on the vehicle state of the trailer vehicle. By taking into consideration the vehicle state of the trailer vehicle, it is ensured that the electric drive is activated with the activation signal such that, from the outset, it is possible to substantially rule out, or at least minimize the risk of, a trailer vehicle being brought into an unstable vehicle state. Safety is thus increased.

According to an embodiment, the determination of the vehicle state particularly preferably includes at least the determination of a load state of the trailer vehicle, in particular including at least the determination of an axle load of the axles of the trailer vehicle and additionally or alternatively a mass distribution in the trailer vehicle. The load state and/or the mass distribution can preferably be determined by determining the pressures of air springs of the trailer vehicle or via a load-dependent brake force controller. In this way, in particular in the case of electric drives with individual wheel drive, that is, with several electric motors which are each assigned to a single wheel for drive purposes, different drive torques can be generated overall in a manner dependent on the mass distribution or the load state. In this case, these different drive torques would be specified in the activation signal for the electric drive. A loss of traction and in particular a loss of stability of the trailer vehicle when assisting the towing vehicle in the event of a loss of traction of the towing vehicle is thus counteracted.

According to a further embodiment, the generation of the activation signal and/or of the acceleration demand is performed additionally in a manner dependent on at least one articulation angle. Here, at least a first articulation angle between the towing vehicle and the trailer vehicle is determined. In the event that the trailer vehicle is a further trailer vehicle attached to the trailer vehicle, a further articulation angle between the trailer vehicle and the further trailer vehicle is determined.

By taking into consideration the articulation angle(s), it is possible that, when the towing vehicle is being assisted by a trailer vehicle, forward drive is imparted to the full extent only if no articulation angle is present, that is, the towing vehicle and trailer vehicle(s) are arranged substantially in a straight line. Depending on the articulation angle(s), an activation signal or an acceleration demand for demanding a correspondingly reduced drive torque is then generated if an articulation angle is present. In particular, the assistance of the trailer vehicle in the event of a loss of traction of the towing vehicle may be prevented entirely if one or more articulation angles lie above predefined threshold values. This further increases the stability of the vehicle combination composed of towing vehicle and trailer vehicle.

According to a further embodiment, the differential slip between at least two wheels of the trailer vehicle which are driven via the electric drive is determined, in particular via the electric drive. The activation signal furthermore includes at least one maximum torque value or corresponds to at least one maximum torque value. According to the embodiment, the drive torque is increased via the electric drive from a predefined starting value in stepped fashion, in particular by a predefined step value and with a predefined time interval, or continuously, in particular with a predefined gradient profile with respect to time, up to the maximum torque value. The increase takes place as long as the differential slip lies below a further predefined threshold value.

The embodiment ensures that, on the basis of a slippery road surface which is the cause of a loss of traction of the towing vehicle, a loss of traction of the electrically driven wheels of the trailer vehicle is also likely, at least in the event of a sudden increase in torque for the purposes of assistance. The drive torque is therefore increased continuously or in stepped fashion from the predefined starting value, at which for example no drive torque whatsoever or only a low drive torque is generated, for as long as there is no significant differential slip of the drive wheels. The starting value is preferably predetermined as a drive torque with a value of zero or with a low value of for example 10 to 100 Nm, in particular 10 Nm. In any case, the starting value is selected such that the trailer vehicle does not push the towing vehicle via the electric drive in any situation. A loss of traction or spinning of the drive wheels of the trailer vehicle is thus prevented.

According to a further embodiment, the acceleration demand corresponds to or includes a maximum drive torque to be generated, wherein the activation signal is generated such that the maximum drive torque to be generated is not exceeded, in particular in order that the trailer vehicle does not push against the towing vehicle. This ensures that no more forward drive is generated by the trailer vehicle than is necessary for example to compensate for the loss of traction of the towing vehicle, and which would have to be reduced again by intervention of the brakes, in particular of the towing vehicle, or would otherwise lead to an unstable state of the vehicle combination.

According to a further embodiment, a differential slip between at least one driven and one driveless wheel of the trailer vehicle is monitored via the trailer brake control unit, and the activation signal is determined in a manner dependent on this differential slip. It is taken into consideration here that, during unstable travel of the trailer vehicle, for example owing to a loss of traction of the driven wheels, the drive torque demanded of the electric drive is reduced via the activation signal in order to regain traction.

According to a further embodiment, in the case of a detected differential slip of the trailer vehicle between at least one driven and one driveless wheel, individual wheels are activated with an activation signal that includes individual drive torques for the individual driven wheels, and/or are individually braked, in order to keep the trailer vehicle straight during pushing operation.

It is thus preferably the case that, in the event of a loss of traction of the trailer vehicle, the activation signal in the case of a central electric motor of the electric drive with differential drive is generated such that the total torque of the electric motor is reduced. Individual wheels, which are driven via the central motor, or several wheels may additionally be braked on a side-selective basis in order to keep the trailer vehicle straight during pushing operation. Preferably, individual or side-selective braking is additionally dependent on the axle modulator installed in the trailer vehicle. In the event that the electric drive in the trailer vehicle is provided as an individual-wheel drive, the activation signal is generated such that a torque reduction takes place in the event of spinning of the tires, wherein the torque reduction is controlled on a wheel-specific basis by the respective inverter of the electric drive that is assigned to the electric motor of a wheel. For this purpose, the activation signal includes several demanded drive torques for each of the electric motors respectively. If a drive wheel tends to spin, the torque is reduced by reducing the power supplied to each electric motor. Here, too, stability can be achieved through individual wheel braking or side-selective braking by generator operation of the electric motors. If the torque reduction or electrical braking is not sufficient, a friction brake is also used. Brake wear can thus be reduced.

The disclosure further relates to a towing vehicle which is in particular configured to carry out the method as described in relation to any one of the aforementioned embodiments. The towing vehicle includes at least one brake control unit and is configured to determine a differential slip between at least one driven wheel and at least one driveless wheel of the towing vehicle via the brake control unit, which differential slip lies above a predefined threshold value. The towing vehicle is furthermore configured to generate an acceleration demand in a manner dependent on the determined differential slip and to transmit the acceleration demand to a trailer brake control unit of a trailer vehicle.

The disclosure furthermore includes a trailer vehicle, in particular for carrying out a method according to any one of the aforementioned embodiments. The trailer vehicle is furthermore configured for coupling to a towing vehicle according to the disclosure. The trailer vehicle has at least one trailer brake control unit and an electric drive. The trailer brake control unit is configured to receive an acceleration demand and, via the trailer brake control unit, generate from the acceleration demand an activation signal for an electric drive of the trailer vehicle. For this purpose, the electric drive includes at least one energy store, at least one converter, which is also referred to as an inverter, and at least one electric motor. Furthermore, the electric drive is configured to generate a drive torque in a manner dependent on the activation signal.

The disclosure furthermore includes a vehicle combination composed of the aforementioned towing vehicle according to the disclosure and the aforementioned trailer vehicle according to the disclosure.

The disclosure furthermore includes a computer program product which has program code which, executed on a brake control unit of a towing vehicle, executes those steps of the method according to any one of the embodiments which are executed via the brake control unit, wherein the computer program product furthermore has further program code which, executed on a trailer brake control unit, executes those steps of the method according to any one of the embodiments that are executed via the trailer brake control unit. The computer program product may be stored on a non-transitory computer readable medium.

BRIEF DESCRIPTION OF THE DRAWINGS

The invention will now be described with reference to the drawings wherein.

DESCRIPTION OF THE PREFERRED EMBODIMENTS

Figure 1:
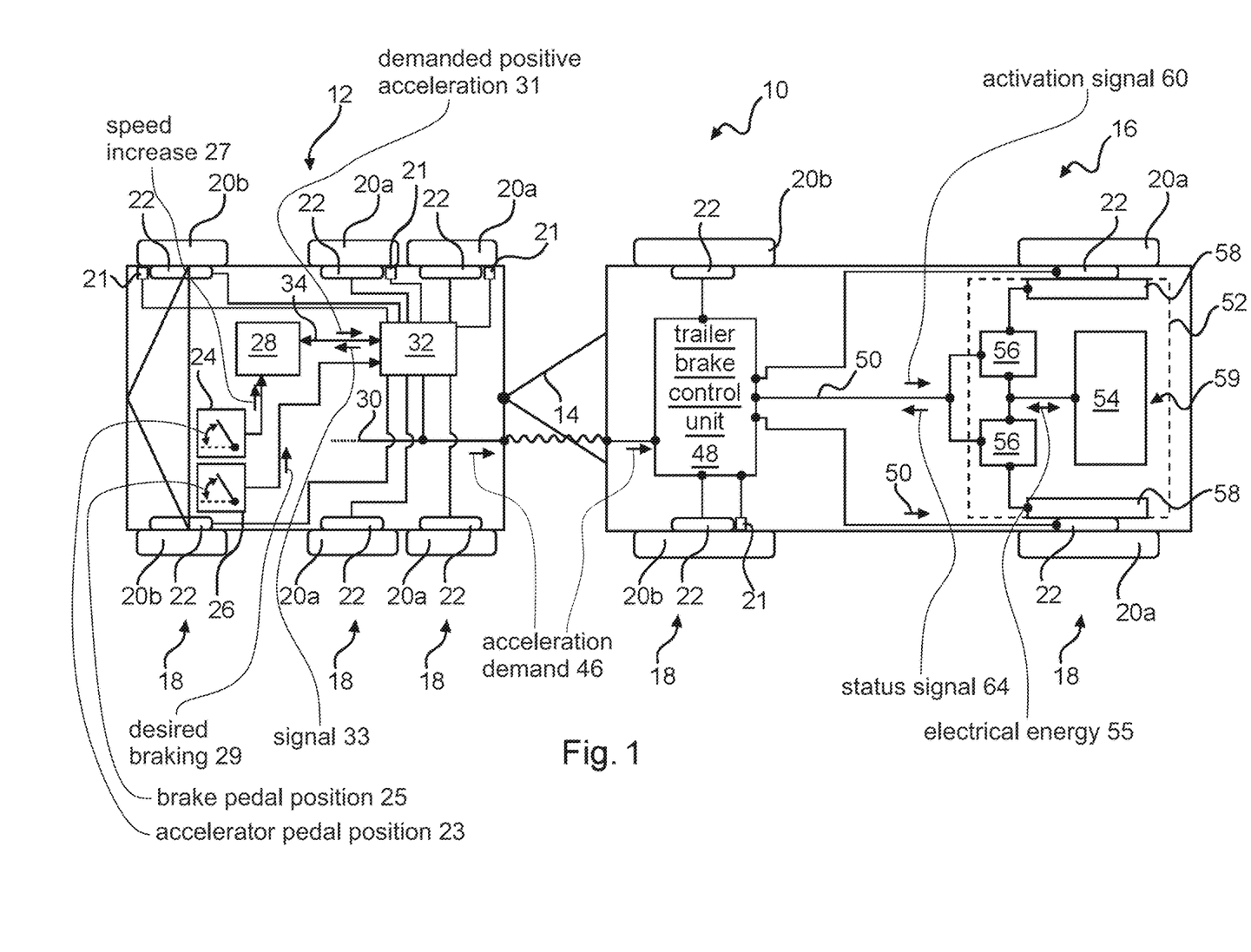
FIG. 1 shows a vehicle combination composed of a towing vehicle and a trailer vehicle; and, FIG. 2 shows the steps of an embodiment of the method.

FIG. 1 shows a vehicle combination 10. The vehicle combination 10 includes a towing vehicle 12, which is for example a utility vehicle. The towing vehicle 12 is connected to a trailer vehicle 16 of the vehicle combination 10 via a drawbar 14. The trailer vehicle 16 can thus be towed by the towing vehicle 12. The towing vehicle 12 and the trailer vehicle 16 each have multiple axles 18, each of which has two wheels 20a, 20b. The wheels 20a are driven wheels and thus belong to a drive axle 18, and the wheels 20b are driveless wheels and belong to a non-driven axle 18. Driveless wheels 20b refer here to non-driven wheels. Each of the wheels 20a, 20b is equipped with a friction brake 22 in order to brake the wheels 20a, 20b in the event of desired braking. At least one of the axles 18 of the towing vehicle 12 is driven by an internal combustion engine or an electric drive, wherein, for the sake of better clarity, neither an internal combustion engine nor an electric drive is illustrated in FIG. 1.

To drive the towing vehicle 12, a desire for a speed increase 27 or desired braking 29 is signaled by an operator of the towing vehicle 12 by varying an accelerator pedal position 23 of an accelerator pedal 24 and by varying a brake pedal position 25 of a brake pedal 26. According to an alternative embodiment, the desire for a speed increase 27 or desired braking 29 is generated by a controller that controls autonomous operation or driver assistance operation. In the embodiment illustrated here, however, for the purposes of signaling, the accelerator pedal 24 is connected to a vehicle control unit 28 and the brake pedal 26 is connected to a brake control unit 32. The vehicle control unit 28 transmits control signals for activating the drive (not illustrated) to a bus (not illustrated) that is connected to the vehicle control unit 28. In response to the desire for a speed increase 27, the vehicle control unit 28 transmits a demanded positive acceleration 31 and also transmits this to the brake control unit 32 via a connection 34. The brake control unit 32 monitors, in particular in the case of a demanded positive acceleration 31, a differential slip between at least one driven wheel 20a and one driveless wheel 20b. For this purpose, wheel rotational speed sensors 21 are provided at the wheels 20a, 20b. If a differential slip above a predefined threshold value is detected in the brake control unit 32, this is interpreted as a loss of traction of the towing vehicle 12. The brake control unit 32 then generates a signal 33 for reducing the drive torque for the vehicle control unit 28 and transmits this to the vehicle control unit 28 via the connection 34. In addition, an acceleration demand 46 is generated and sent out on a CAN-ISO 11992-2 bus 30. The bus 30 is connected to a trailer brake control unit 48 of the trailer vehicle 16, to which the acceleration demand 46 is transmitted.

An electric drive 52 is also connected, via a further bus 50, to the trailer brake control unit 48 that receives the acceleration demand 46 via the bus 30. The electric drive includes a battery 54, which is rechargeable and can also be referred to as a storage battery. In addition to the battery 54, the electric drive 52 includes two converters 56, which supply electric motors 58 with the energy from the battery 54 in order to generate a positive torque. The battery 54, the converters 56 and the electric motors 58 correspond to components 59 of the electric drive 52. According to an alternative embodiment, only one electric motor 58 is provided, which also has only one converter 56 and drives two or more wheels 20a via a differential.

The electric motors 58 in FIG. 1 can also be operated in generator mode or as a generator, such that electrical energy 55 is fed back into the battery 54 via the converter 56. The converter 56 of the electric drive 52 is connected to the trailer brake control unit 48 via the further bus 50 in order to receive an activation signal 60 from the trailer brake control unit 48, which activation signal 60 is generated in the trailer brake control unit 48 in a manner dependent on the acceleration demand 46.

An activation of the converter 56, which is performed in a manner dependent on the activation signal 60, specifies on the one hand whether the electric motors 58 are to be operated in generator mode or in motor mode, and what torque is to be imparted in this case. The term positive torque is used in the case of operation of the electric motors 58 in motor mode, whereas the torque, that is, a value of the torque, in the generator mode of the electric motors 58 is referred to as negative torque.

Since, in the present case, assistance of the towing vehicle 12 is desired in the event of a loss of traction, activation signals 60 only with at least one positive torque value are considered here.

For the activation of the electric drive 52, namely in particular of the converter 56, the activation signal 60 is accordingly sent from the trailer brake control unit 48 via the further bus 50 to the electric drive 52 and, in the present case, two torque values are taken from the activation signal 60, which are used to generate wheel-specific drive torques. The electric drive 52 can preferably also send a status signal 64 to the trailer brake control unit 48 in order to be able to inform the trailer brake control unit 48, for example or inter alia, what presently available positive torque or what presently available positive change in torque can be provided by the electric drive 52 at the present point in time. The presently available torques or changes in torque are for example dependent on the present operating state of the electric drive 52.

The trailer brake control unit 48, as well as the brake control unit 32 of the towing vehicle 12, is furthermore connected to rotational speed sensors 21 in order to monitor a differential slip between at least one driven wheel 20*a* and a driveless wheel 20*b* of the trailer vehicle 16, wherein the activation signal 60 can then be determined from the acceleration demand 46 additionally in a manner dependent on the differential slip.

Figure 2:
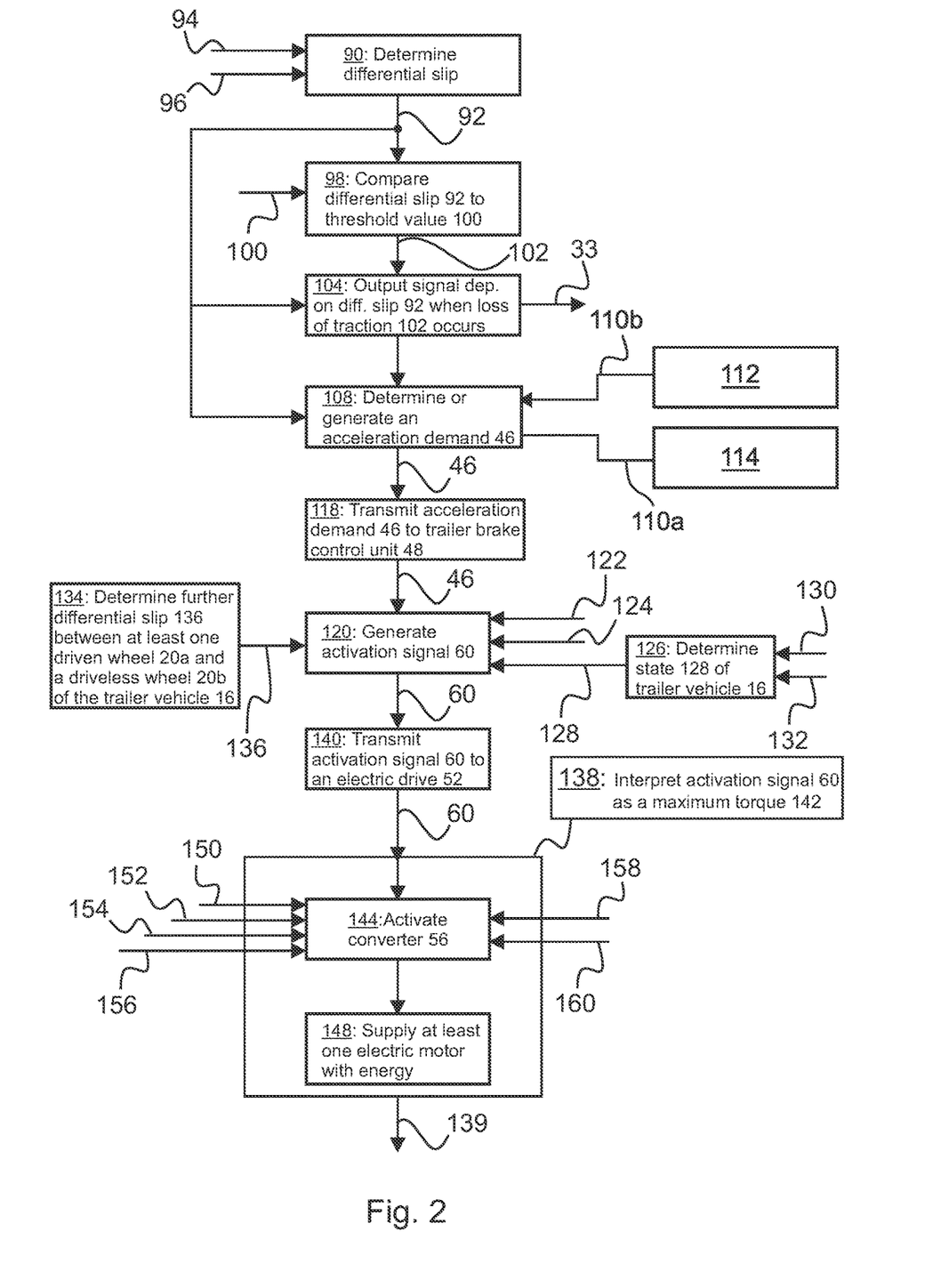

FIG. 2 shows the steps of an embodiment of the method. First, in a step 90, a differential slip 92 is determined. For this purpose, sensor signals 94 from a wheel rotational speed sensor 21 at a driven wheel 20*a* of the towing vehicle 12 and sensor signals 96 from a further wheel rotational speed sensor 21 at a driveless wheel 20*b* of the towing vehicle 12 are supplied to determination step 90. In a step 98, the differential slip 92 is compared with a threshold value 100 and, if the differential slip 92 exceeds the threshold value 100, a loss of traction 102 is reported and output. In a step 104, in a manner dependent on the differential slip 92 when the loss of traction 102 occurs, a signal 33 is then output which is transmitted to a vehicle control unit 28 in order to reduce the engine torque of an engine of the towing vehicle 12. In addition, in step 104, a command is output in order to then determine or generate an acceleration demand 46 in a step 108. Aside from the differential slip 92, desired accelerations 110*a*, 110*b* from driver control elements 112 and/or driver assistance systems 114 are also supplied for the purposes of generating the acceleration demand 46. The acceleration demand 46 is then output and, after a transmission step 118, in which the acceleration demand 46 is transmitted to a trailer brake control unit 48, an activation signal 60 is generated from the acceleration demand 46 in a step 120.

To generate the activation signal 60, an articulation angle 122 between the towing vehicle 12 and a trailer vehicle 16, and optionally a further articulation angle 124 between the trailer vehicle 16 and a further trailer vehicle 16, are supplied to the step 120. In addition, in a step 126, a state of the trailer vehicle 16 is determined, and this state 128 is additionally taken into consideration in the generation of the activation signal 60. In step 126, the state 128 of the trailer vehicle 16 is determined from the axle load 130 and a mass distribution 132. Furthermore, a further differential slip 136 between at least one driven wheel 20*a* and a driveless wheel 20*b* of the trailer vehicle 16 is determined in a step 134. The differential slip 136 is likewise taken into consideration in the generation of the activation signal 60 in step 120. The activation signal 60 generated is then transmitted to an electric drive 52 in a step 140.

In a step 138, one or more drive torques 139 are generated via one or more electric motors 58, and the driven wheels 20*a* of the trailer vehicle 16 that are connected to the electric motors 58, in a manner dependent on the activation signal 60. First, in step 138, the activation signal 60 is interpreted via the electric drive 52 as a maximum drive torque 142, and a converter 56 is activated therewith in an activation step 144. In a manner dependent on the activation, at least one electric motor 58 is supplied with energy from an energy store in a step 148. Here, a starting value 150, a step size 152, a time interval 154 and a predefined threshold value 156 are supplied to step 144. In a manner dependent on these input values, the electric motor 58 is activated such that, proceeding from the starting value 150, a torque is correspondingly generated via the motor 58, which torque increases by a step size 152 each time the time interval 154 expires, up to the maximum drive torque 142, for as long as a differential slip 158, which is likewise supplied to step 144, of at least two wheels 20*a* driven via the electric drive 52 lies below the predefined threshold value 156.

In addition, a predefined gradient profile 160 with respect to time is supplied to the activation step 144, such that it is alternatively possible for the electric motor 58, starting from the starting value 150, to continuously increase the generated torque in accordance with the gradient 160 until the maximum drive torque 142 is reached.

Via the provided drive torque 139, the towing vehicle 12 is assisted by the trailer vehicle 16 in the event of a loss of traction 102 of the trailer vehicle 16.

It is understood that the foregoing description is that of the preferred embodiments of the invention and that various changes and modifications may be made thereto without departing from the spirit and scope of the invention as defined in the appended claims.

What is claimed is:

1. A method for assisting a towing vehicle in the event of a loss of traction via a trailer vehicle, the method comprising:
determining a differential slip between at least one driven wheel and at least one driveless wheel of the towing vehicle via a brake control unit of the towing vehicle, wherein the differential slip lies above a predefined threshold value;
generating an acceleration demand in a manner dependent upon the determined differential slip in the brake control unit mounted on the towing vehicle;
transmitting the acceleration demand to a trailer brake control unit mounted on the trailer vehicle;
generating an activation signal for an electric drive of the trailer vehicle in a manner dependent upon the acceleration demand in the trailer brake control unit;
transmitting the activation signal from the trailer brake control unit to the electric drive of the trailer vehicle;
generating at least one drive torque via the electric drive of the trailer vehicle in a manner dependent on the activation signal;
determining a trailer vehicle differential slip between at least two wheels of the trailer vehicle which are driven via the electric drive; and,
increasing an activation torque for generating the drive torque via the electric drive from a predefined starting value in stepped fashion or continuously up to a maximum torque value as long as the trailer vehicle differential slip of the driven wheels of the trailer vehicle lies below a further predefined threshold value; and,
wherein the activation signal corresponds to or includes the maximum torque value.

2. The method of claim 1, wherein said transmitting of the acceleration demand to the trailer brake control unit includes transmitting the acceleration demand via a CAN-ISO 11992-2 bus.

3. The method of claim 1, wherein the acceleration demand is determined in a manner dependent upon the differential slip of the towing vehicle and a desired acceleration from a driver control element or a driver assistance system.

4. The method of claim 1 further comprising:
determining a vehicle state of the trailer vehicle via the trailer brake control unit; and, wherein said generating the activation signal for the electric drive of the trailer vehicle is performed in a manner additionally dependent upon the vehicle state of the trailer vehicle.

5. The method of claim 4, wherein at least one load state of the trailer vehicle is taken into consideration in said determining the vehicle state of the trailer vehicle.

6. The method of claim 4, wherein at least one of a mass distribution in the trailer vehicle and an axle load of an axle of the trailer vehicle are taken into consideration in said determining the vehicle state of the trailer vehicle.

7. The method of claim 1 further comprising:
determining an articulation angle between the towing vehicle and the trailer vehicle; and,
wherein at least one of the generation of the activation signal and the generation of the acceleration demand is generated additionally in a manner dependent on the determined articulation angle.

8. The method of claim 7 further comprising determining a further articulation angle between the trailer vehicle and a further trailer vehicle in the event that the trailer vehicle has a further trailer vehicle attached thereto.

9. The method of claim 1, wherein the generation of the at least one drive torque via the electric drive includes an activation of at least one electrical converter of the trailer vehicle for a supply of energy from an energy store of the trailer vehicle to at least one electric motor of the trailer vehicle.

10. The method of claim 1, wherein the stepped fashion includes a predefined step size and a predefined time interval.

11. The method of claim 1, wherein the trailer vehicle differential slip is determined via the electric drive.

12. The method of claim 1, wherein the acceleration demand corresponds to or includes a maximum drive torque to be generated via the electric drive; and, the activation signal is generated such that the maximum drive torque to be generated is not exceeded.

13. The method of claim 1 further comprising:
monitoring a trailer vehicle differential slip of the trailer vehicle between at least one driven wheel and one driveless wheel of the trailer vehicle via the trailer brake control unit; and,
wherein the activation signal is determined in a manner dependent on the trailer vehicle differential slip.

14. The method of claim 13, wherein, in the trailer vehicle, individual wheels are at least one of individually braked and activated with individual activation signals for the generation of a drive torque.

15. A towing vehicle comprising:
a brake controller to determine a loss of traction via the brake controller; and,
the towing vehicle being further configured to determine an acceleration demand in a manner dependent upon a differential slip which leads to the determined loss of traction and to transmit the acceleration demand to a trailer brake controller;
the trailer brake controller being configured to determine a trailer vehicle differential slip between at least two wheels of a trailer vehicle which are driven via an electric drive; and,
the trailer brake controller being further configured to increase an activation torque for generating a drive torque via the electric drive from a predefined starting value in stepped fashion or continuously up to a maximum torque value as long as the trailer vehicle differential slip of the driven wheels of the trailer vehicle lies below a further predefined threshold value; and,
wherein an activation signal corresponds to or includes the maximum torque value.

16. The towing vehicle of claim 15, wherein the towing vehicle is further configured to:
determine the differential slip between at least one driven wheel and at least one driveless wheel of the towing vehicle via the brake controller of the towing vehicle, wherein the differential slip lies above a predefined threshold value.

17. A trailer vehicle comprising:
an electric drive;
a trailer brake controller to receive an acceleration demand from a brake controller of a towing vehicle and to generate an activation signal for activating said electric drive in a manner dependent upon the acceleration demand;
said electric drive being further configured to generate a drive torque in a manner dependent upon the activation signal;
the trailer brake controller being configured to determine a trailer vehicle differential slip between at least two wheels of a trailer vehicle which are driven via the electric drive; and,
the trailer brake controller being further configured to increase an activation torque for generating the drive torque via the electric drive from a predefined starting value in stepped fashion or continuously up to a maximum torque value as long as the trailer vehicle differential slip of the driven wheels of the trailer vehicle lies below a further predefined threshold value; and,
wherein the activation signal corresponds to or includes the maximum torque value.

18. A vehicle combination comprising:
a towing vehicle having a brake controller to determine a loss of traction via the brake controller;
a trailer vehicle having an electric drive and a trailer brake controller to receive an acceleration demand from a brake controller of a towing vehicle and to generate an activation signal for activating said electric drive in a manner dependent upon the acceleration demand,
wherein the electric drive generates a drive torque in a manner dependent upon the activation signal;
said towing vehicle being further configured to determine an acceleration demand in a manner dependent upon a differential slip which leads to the determined loss of traction and to transmit the acceleration demand to the trailer brake controller;
said trailer vehicle being connected to said towing vehicle via a CAN-ISO 11992-2 bus;
said trailer brake controller being configured to determine a trailer vehicle differential slip between at least two wheels of the trailer vehicle which are driven via the electric drive; and,
said trailer brake controller being further configured to increase an activation torque for generating the drive torque via the electric drive from a predefined starting value in stepped fashion or continuously up to a maximum torque value as long as the trailer vehicle differential slip of the driven wheels of the trailer vehicle lies below a further predefined threshold value; and,
wherein the activation signal corresponds to or includes the maximum torque value.

19. A computer program product comprising:
a towing vehicle program code stored on a non-transitory computer readable medium which, when executed by a processor of a towing vehicle brake controller of a towing vehicle, is configured to determine a differential slip between at least one driven wheel and at least one driveless wheel of the towing vehicle, wherein the differential slip lies above a predefined threshold value and to generate an acceleration demand in a manner dependent upon the determined differential slip and further configured to transmit the acceleration demand to a trailer brake controller of a trailer vehicle;

a trailer vehicle program code stored on a non-transitory computer readable medium which, when executed by a processor of the trailer brake controller, is configured to generate an activation signal for an electric drive of the trailer vehicle in a manner dependent upon the acceleration demand and to transmit the activation signal from the trailer brake controller to the electric drive of the trailer vehicle and generate at least one drive torque via the electric drive in a manner dependent on the activation signal;

the trailer brake controller being configured to determine a trailer vehicle differential slip between at least two wheels of the trailer vehicle which are driven via the electric drive; and, the trailer brake controller being further configured to increase an activation torque for generating the at least one drive torque via the electric drive from a predefined starting value in stepped fashion or continuously up to a maximum torque value as long as the trailer vehicle differential slip of the driven wheels of the trailer vehicle lies below a further predefined threshold value; and, wherein the activation signal corresponds to or includes the maximum torque value.

20. The method of claim 1, wherein the method steps are performed in the sequence set forth and not otherwise.

* * * * *